United States Patent [19]

McNeel

[11] Patent Number: 4,470,134

[45] Date of Patent: Sep. 4, 1984

[54] MARSH CASE FOR A GEOPHONE

[75] Inventor: William O. McNeel, Houston, Tex.

[73] Assignee: Litton Resources Systems, Inc., Alvin, Tex.

[21] Appl. No.: 362,352

[22] Filed: Mar. 26, 1982

[51] Int. Cl.³ .................... G01V 1/16; H01R 13/58
[52] U.S. Cl. ............................. 367/188; 174/65 SS
[58] Field of Search ............... 174/65 SS; 339/103 R, 339/103 B, 105, 106; 367/188

[56] References Cited

U.S. PATENT DOCUMENTS

| | | | |
|---|---|---|---|
| 2,361,215 | 10/1944 | Lamberger et al. | 174/65 SS |
| 3,667,783 | 6/1972 | Sotolongo | 285/161 |
| 3,931,453 | 1/1976 | Hall, Jr. | 367/188 |
| 4,299,363 | 11/1981 | Datschefski | 248/56 |

Primary Examiner—Maynard R. Wilbur
Assistant Examiner—K. R. Kaiser
Attorney, Agent, or Firm—William A. Knox

[57] ABSTRACT

A geophone marsh case, for use in wetlands, contains a geophone. An electric cable delivers geophone signals to the outside world and provides a means for pulling an emplaced geophone from the mud. The cable is anchored to the marsh case both internally and externally in order to preserve the integrity of a water seal that surrounds the cable in the cable entry port of the marsh case.

2 Claims, 2 Drawing Figures

MARSH CASE FOR A GEOPHONE

BACKGROUND OF THE INVENTION

1. Field of the Invention

This invention relates to an improved geophone case for use in wetland areas.

2. Discussion of the Prior Art

In wetland areas, marshes and the like, geophones as used in seismic exploration are enclosed in special cases or housings. A marsh case is generally long and slender; one end, the lower end, of the case is pointed to facilitate insertion of the unit into mud. The other, upper end of the case has a cable entry port through which an electric cable is sealed. The cable conducts the geophone signals to the outside world. The upper end of the case is designed to fit a tool on the end of a long pole so that the marsh geophone can be shoved into the mud. The cable entry port must, of course, be sealed against entry of moisture.

When geophysical operations are completed at a given location, the geophone is recovered from the mud by pulling it out by the cable. The cable must therefore be firmly anchored internally of the case. For example, see U.S. Pat. No. 3,931,453, assigned by mesne assignments to a sister firm of the assignee of this invention.

Although the cable itself is firmly anchored interiorly of the case, when a pull is applied, the cable necessarily stretches. Because it is stretched, the diameter of the cable tends to diminish; it tends to "neck out", particularly at the cable entry port of the case. During use, the constant stretching and relaxation of the cable with respect to the water seal assembly creates undesired leakage problems. Moisture penetrates the seal into the geophone chamber causing corrosion and electrical problems.

SUMMARY OF THE INVENTION

The improved marsh case of this invention includes a case having a chamber for removably receiving a geophone. One end of the case has a cable entry port of generally cylindrical configuration. A perforated divider separates the chamber from the cylindrical cable entry port. An electric cable, connected to the geophone, is inserted through the perforated divider. An internal cable anchor is secured to the cable between the geophone and the underside of the divider. A resilient seal encircles the cable and is seated on the upper side of the divider. A compression sleeve urges the seal against the divider. An external cable anchor firmly grips the cable externally of the compression seal.

BRIEF DESCRIPTION OF THE DRAWING

The advantages of this invention can best be appreciated by reference to the appended description and the drawings wherein.

DETAILED DESCRIPTION OF THE PREFERRED EMBODIMENT

Figure 1:
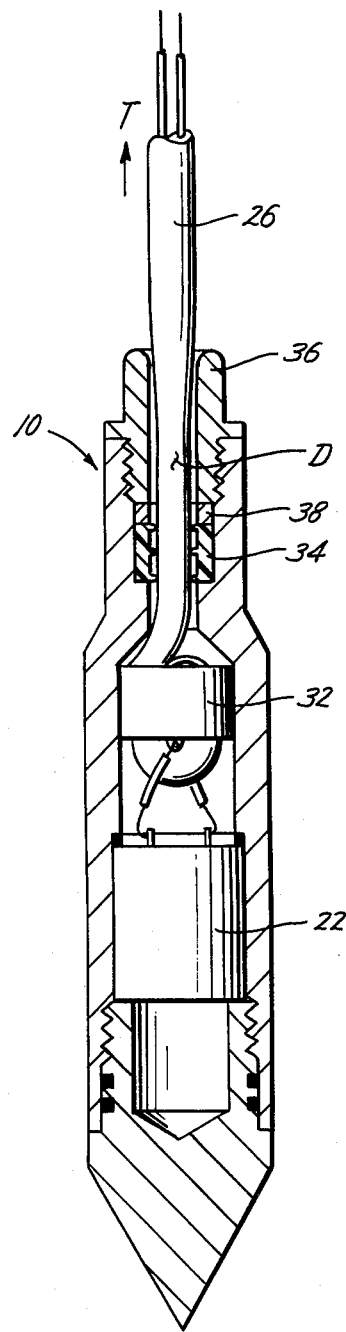
FIG. 1 is a cross-sectional view of a prior-art geophone marsh case illustrating cable shrinkage due to a pull on the conductor cable.

FIG. 1 is a cross section of the essential features of U.S. Pat. No. 3,931,453, mentioned earlier in this disclosure. Briefly, a geophone 22 is contained within case 10. An electric cable 26 conveys geophone signals to the outside world. An internal cable anchor is formed by looping cable 26 three times through the anchor fixture 32. A resilient seal 34 is squeezed into a sealing cell by threaded compression sleeve 36.

With cable 26 relaxed the sealing action of compressed seal 34 is quite adequate to keep moisture out of the inside of case 10. However, when an upward tension T, shown by the arrow, is applied to the cable to pull case 10 out of the mud, cable 26 is subject to a local diameter reduction as shown at D. The reduction in diameter extends from cable anchor 32, upward for an indefinite distance. An imperfect seal necessarily results.

Figure 2:
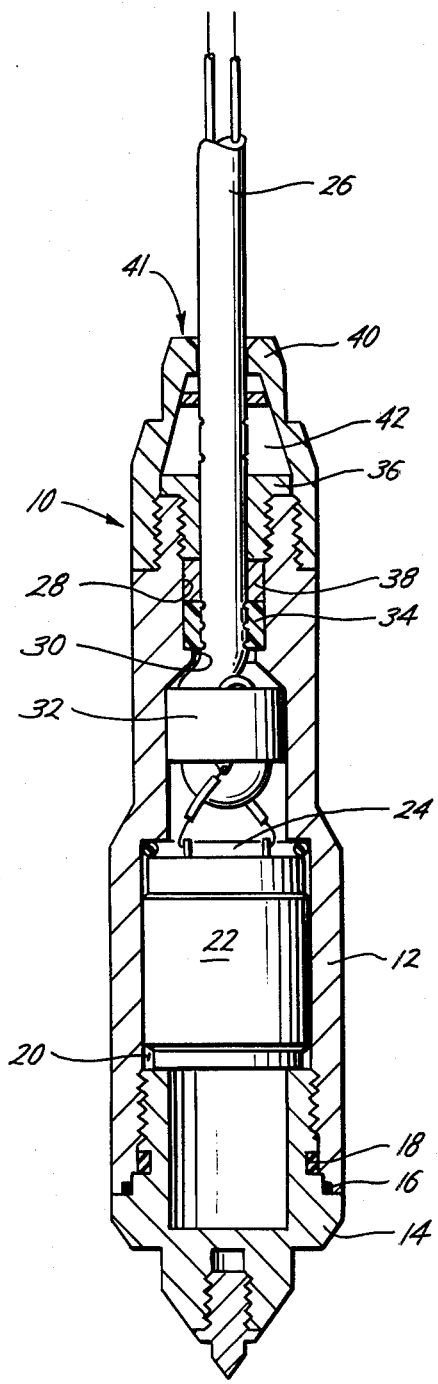
FIG. 2 is a cross-sectional view of the cable anchoring means of this invention.

Referring now to FIG. 2 there is shown a marsh-type geophone case 10. The marsh case includes a body member 12 which is substantially longer than its diameter. The case is closed at its lower end by a tapered or pointed plug 14. Plug 14 is sealed to body member 12 by O-rings 16 and 18 when plug 14 is screwed into place. A chamber 20 removably receives a geophone 22 which is held in position by plug 14 against O-ring 24. A cable 26 is electrically connected to geophone 22 and enters through the top of body member 12 through a cable entry port 28 of a generally cylindrical configuration which forms the upper portion of body member 12. A perforated divider 30 separates geophone chamber 20 from the interior of cable entry port 28.

An internal cable anchor 32 is positioned between geophone 22 and the underside of perforated divider 30. Because internal cable anchor 32 is decribed fully in U.S. Pat. No. 3,931,453, in the interest of brevity, it will not be described here. A resilient seal 34 of soft synthetic rubber or the like, having preferably a durometer reading of 45, abuts the upper side of divider 30. A threaded compression sleeve 36 screws into mating threads in the wall of cable entry port 28. By means of a spacer 38, compression sleeve 36 axially urges resilient seal 34 against divider 30. The applied axial force also causes resilient seal 34 to expand radially to form a water tight seal around cable 26 and against the wall of cable entry port 28.

One form of an external cable anchor 41 comprises a gland nut 40 having an internal taper and a mating multiple-jaw collet 42. Gland nut 40 has internal threads that mate with corresponding thread on the outer wall of body member 12. When gland nut 40 is screwed into place, it forces the jaws of collet 42 to shrinkably grip cable 26 after the fashion of a Jacobs chuck commonly used with machine tools. The collet 42 may be internally serrated to better grip the cable as shown in FIG. 2. The combination of a gland nut 40 and a multiple-jaw collet such as 42 are described in, for example, U.S. Pat. Nos. 3,667,783 and 4,299,363, the first of which is incorporated herein by reference only insofar as the combination is concerned. Accordingly, a detailed description is not required here.

The presence of external cable anchor 41 prevents cable 26 from stretching and working with respect to resilient seal 34, thereby preserving water tight integrity. Whatever stretch occurs will lie beyond external cable anchor 41. Internal cable anchor 32, of course, provides an extra margin of safety if the external cable anchor should fail for some reason.

In assembling the unit, cable 26, which may be several feet long, is electrically connected to geophone 22 and internal cable anchor 32 is secured thereto. With plug 14 removed, the cable 26, internal cable anchor 32 and geophone 22 are inserted into body member 12. Thereafter plug 14 is replaced. Resilient seal 34, spacer 38 and compression sleeve 36 are next slipped over the free end of cable 26 and screwed into place. External cable anchor 41 is tightened around the cable to complete the assembly.

It will be evident to those skilled in the art that other forms of an external cable anchor may be designed. This invention is limited only be the appended claims.

I claim as my invention:

1. An improved watertight geophone marsh case for use in wetlands, having a chamber for removably receiving a geophone module, having a cable entry port at one end thereof for receiving an electric cable therethrough to transmit signals from said geophone module, a sealing washer around said cable and seated in said cable entry port, the cable entry port being of a generally cylindrical configuration and including a perforated divider between the chamber and the cylindrical cable entry port, comprising in combination:

an internal cable anchor secured to the cable and disposed inside the chamber betwixt the geophone module and one side of the perforated divider, one end of said cable being inserted through the divider perforation;

a compression sleeve and a spacer, threadably engaging said cylindrical cable entry port internally, for urging said sealing washer against said divider; and an external cable anchor assembly, threadably engaging said cylindrical cable entry port externally and including an interiorly serrated collet for shrinkably and firmly gripping said cable.

2. In a marsh-type geophone for use in wetlands, consisting of an external case assembly for containing a geophone and having a cable entry port at one end thereof, a compression-sleeve water seal, and a cable, coupled to the geophone on one side of the compression-sleeve, passing through both said cable entry port and said compression sleeve, the improvement comprising:

an external cable anchor assembly, including an internally serrated collet, threadably engaging said external case assembly for firmly and shrinkably gripping said cable on the side of said compression sleeve opposite to said geophone to inhibit cable stretch with respect to said compression sleeve.

* * * * *